United States Patent
Davis et al.

(10) Patent No.: US 11,098,459 B1
(45) Date of Patent: Aug. 24, 2021

(54) DRAINAGE UNITS WRAPPED IN SUNLIGHT-IMPEDING WRAPPING

(71) Applicant: Infiltrator Water Technologies, LLC, Old Saybrook, CT (US)

(72) Inventors: Terry Ray Davis, Means, KY (US); Ronald Brochu, Richmond, KY (US)

(73) Assignee: INFILTRATOR WATER TECHNOLOGIES LLC, Old Saybrook, CT (US)

( * ) Notice: Subject to any disclaimer, the term of this patent is extended or adjusted under 35 U.S.C. 154(b) by 0 days.

(21) Appl. No.: 15/201,933

(22) Filed: Jul. 5, 2016

Related U.S. Application Data

(60) Provisional application No. 62/188,600, filed on Jul. 3, 2015.

(51) Int. Cl.
| | | |
|---|---|---|
| *E02B 11/02* | (2006.01) | |
| *E02B 11/00* | (2006.01) | |
| *E02D 3/10* | (2006.01) | |
| *F16L 58/00* | (2006.01) | |

(52) U.S. Cl.
CPC ........... *E02B 11/005* (2013.01); *E02B 11/02* (2013.01); *E02D 3/103* (2013.01); *F16L 58/00* (2013.01)

(58) Field of Classification Search
CPC ........ E02B 11/005; E02B 11/02; E02D 3/103; F16L 58/00
See application file for complete search history.

(56) References Cited

U.S. PATENT DOCUMENTS

| | | | | |
|---|---|---|---|---|
| 3,460,671 | A | * 8/1969 | Harm | B65D 71/08 206/391 |
| 5,015,123 | A | * 5/1991 | Houck | E02B 11/00 405/36 |
| 6,467,966 | B1 | 10/2002 | Garner | |
| 7,931,423 | B2 | * 4/2011 | Bussey, Jr. | E02B 11/005 383/1 |
| 8,672,584 | B2 | 3/2014 | Koerner | |
| 9,051,703 | B2 | * 6/2015 | Bussey, III | E02B 11/005 |
| 2004/0183221 | A1 | * 9/2004 | Bussey, Jr. | B29C 44/22 264/45.5 |
| 2006/0008641 | A1 | * 1/2006 | Kiehne | C08J 5/18 428/328 |
| 2008/0096988 | A1 | * 4/2008 | Hahn | C08J 9/0066 521/56 |
| 2015/0018460 | A1 | * 1/2015 | Guymon | C08K 11/005 524/21 |

OTHER PUBLICATIONS

USPTO Trademark Registration No. 3,514,543.

* cited by examiner

*Primary Examiner* — Thomas M Wittenschlaeger
(74) *Attorney, Agent, or Firm* — C. Nessler

(57) ABSTRACT

A set of three tubular drainage units, each comprised of expanded recycled polystyrene aggregate which is gray in color, is wrapped in film which optionally compresses the drainage units radially and which impedes transmission of infra-red radiation to the aggregate when the drainage units are exposed to sunlight during shipping or storage.

4 Claims, 2 Drawing Sheets

DRAINAGE UNITS WRAPPED IN SUNLIGHT-IMPEDING WRAPPING

This application claims benefit of provisional patent application Ser. No. 62/188,600, filed Jul. 3, 2015, the disclosure of which is hereby incorporated by reference

TECHNICAL FIELD

The present invention relates to drainage units which may be used in wastewater disposal systems and other underground systems for gathering or dispersing water.

BACKGROUND

A kind of drainage unit used in wastewater disposal systems, and in other subsurface water handling applications, comprises a generally cylindrical shape mass of plastic beads referred to as aggregate, which is contained within in a sleeve of netting. Usually, the netting is light weight and has openings which are only somewhat smaller than the aggregate. Sometimes a barrier of finer mesh material (geotextile) is positioned along the length of a drainage unit, so it runs around up to half of the circumference of the drainage unit—to inhibit downward migration of soil into the interstices among the aggregate. Typically, a perforated corrugated conduit, referred to as pipe herein, runs down the center of the mass of aggregate to distribute wastewater along the length of the drainage unit.

A familiar commercial example of such a unit is an EZflow® drainage unit, sold heretofore by Infiltrator Water Technologies, LLC. A typical commercial drainage unit may be about 12 inches in diameter and ten feet long. Since drainage units are buried within soil, during their useful lifetimes they will be substantially at the soil temperature, and that means that generally they are not exposed to a temperature of more than about 100 degrees F.

Reference may be made to the drainage unit described in U.S. Patents Houck et al. U.S. Pat. No. 5,015,123 and Houck et al. U.S. Pat. No. 6,497,031 and the methods of making described therein. Aggregate is preferably expanded polystyrene (EPS) that is about ¾ inch to 1¼ inch in dimension and has a ribbed shape like that shown in U.S. Pat. No. 6,467,996 of Garner. The disclosures of the foregoing patents are hereby incorporated by reference. Heretofore a proprietary bead having a light blue color, for branding purposes, has been used in the EZflow brand drainage units. See Trademark Registration No. 3,514,543. Prior art blue bead aggregate used in drainage units is formed from pellet raw material supplied as EZbead 98EZ9098 (Rapac L. P., Oakland, Tenn., U.S.). Other manufacturers of drainage units have used white beads and light green beads made from virgin and recycled polystyrene.

Typically, the foregoing kinds of drainage units have been shipped from a manufacturing facility to a storage/distribution site, and finally to a job site where they are installed by being buried in soil. At times during such transport and storage, the units can be exposed to substantial sunlight exposure. It has been common heretofore to encase drainage units in light weight plastic sheeting, mainly to protect the units from netting-damage, and also to inhibit entry of such as dirt and frozen precipitation. Typically drainage units have been bundled in groups of two or three side-by-side for shipment. For economy and functionality (elaborated on in the Description below) a preferred encasement has been a wrap of clear LDPE stretchable film. Less preferably, more costly white tie-closed plastic bags have been used.

Since it is known that ultra-violet (UV) light (less than 400 nm wavelength) is in general damaging to the stretch film encasing material and to the polystyrene aggregate of the drainage unit, the preferred clear film used heretofore with blue bead aggregate drainage units had an ultra-violet light inhibiting additive. Impeding UV light from impinging on the aggregate avoids embrittlement of the polystyrene material of the aggregate during handling and storage of blue bead product. Embrittlement can lead to fracture of the beads and resultant change of drainage unit dimension and escape of beads from their containment within the netting of the unit.

It is desirable for economic and environmental reasons to use recycled polystyrene in drainage units. However, recycled polystyrene material which is white (and therefore can be colored to produce blue or green aggregate) is more costly than recycled polystyrene which comprises mixed in non-white material. However, the not-all-white recycled material can vary in non-white fraction from lot to lot. That can result in an inconsistent drainage product appearance which might lead purchasers to question the quality and consistency of function of the drainage unit product.

SUMMARY

An object of the invention is to provide drainage units which are made of aggregate with a consistent aggregate appearance where the aggregate is formed from recycled polystyrene that includes non-white material.

In accord with the invention, an embodiment of improved method for making a drainage unit comprises forming expanded-foam bead aggregate from recycled polystyrene having about 4 weight percent titanium dioxide, while adding 0.25 weight percent carbon, or other colorant, which gives the beads a gray or other shade uniform appearance; and wrapping a set of three drainage units in film which has the property of inhibiting the transmission of both UV portion and the infra-red portion of the radiation, compared to a clear plastic film.

Preferably, during the wrapping step, there is tension applied to the film sufficient to change the cross section shape of each drainage unit, to decrease the diameter of each drainage unit, and to decrease the width of set of three side-by-side units by at least about 5 percent; and the wrapping of film leaves portions of each end of the set exposed.

The invention enables the use of mixtures of recycled plastic which heretofore was not feasible, and wrapped drainage units may be shipped and stored without suffering deterioration due to exposure to sunlight infra-red radiation, which it has been discovered the uniformly colored beads are subject to, compared to prior art beads.

The foregoing and other objects, features and advantages of the present invention will become more apparent from the following description of preferred embodiments and accompanying drawings.

DESCRIPTION

This application claims benefit of provisional patent application Ser. No. 62/188,600, filed Jul. 3, 2015, the disclosure of which is hereby incorporated by reference.

Figure 1:
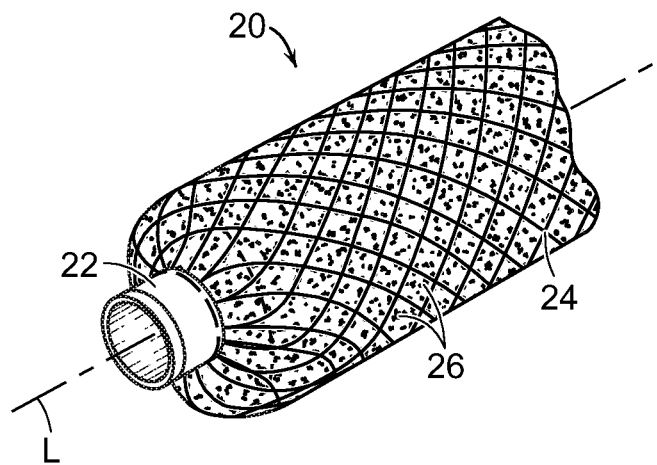
FIG. 1 is a perspective view of a portion of a drainage unit.

An embodiment of drainage unit 20 having a length axis L which is used of the present invention is shown in partial perspective view of FIG. 1. The unit is comprised of aggregate 26, namely ¾ to 1¼ inch dimension irregular shape beads of expanded polystyrene, as described in the Background above. The aggregate is contained within a tubular sleeve 24 which is comprised in part or whole of a coarse-opening netting made of plastic filament, again as described above. The netting does not substantially impede transmittal of any sunlight impinged on the unit 20. An optional perforated pipe 22 runs lengthwise, typically in the center of the drainage unit. Drainage units often may have no pipe 22, particularly when they are placed adjacent units which do have pipes.

As described in more detail below, drainage units are packaged for shipment and storage, typically in sets of three. In this description the terms packaging and wrapping are used interchangeably here to refer to an encasing film of material the runs around the whole periphery of a drainage unit, typically a group of three side-by-side drainage units. At the point and time of use, the packaging is removed and discarded or recycled.

Aggregate for drainage units is formed by first making small dense pellets of polystyrene at a plastic materials manufacturing site, followed by controllably heating and in other ways processing the pellets to expand them into low density beads at a drainage unit manufacturing site. The resultant mass of beads, when included within the netting of a drainage unit, is referred to as aggregate. Typically a blowing agent such as isomeric pentane is captured within the pellets, which are preferably made by extrusion. The amount of blowing agent and subsequent heating step causes the expansion and resultant porosity of the beads and the resultant low density of the aggregate material. The material of which the beads is composed may have a density in the range of about 0.7 to 2.0 pounds per cubic foot (about 11.2 to 32 kilogram per cubic meter). Aggregate comprised of a mass of beads, as is contained with the netting of a drainage unit, may have a density of about 0.4 to 0.5 pounds per cubic foot (about 6.4 to 8 kilogram per cubic meter).

When, in the past, it was an aim to have aggregate with a blue color, colorant believed to be blue pigment was added to produce intensely dark blue pellets of commercial virgin polystyrene having a white ceramic filler material, typically finely ground titanium dioxide of about 4 weight percent. The resultant expanded-foam bead is light blue in appearance.

In the present invention, aggregate is formed from polystyrene starting material that is comprised in part or all of recycled polystyrene which is a mixture of white and variable heterogeneous color material. To make the aggregate in a drainage unit product have a more or less consistent color, in preferred embodiments of the present invention carbon black is added to impart a black color to polystyrene pellets which are comprised of recycled mostly-white and other-color material. For example, carbon black may be added in an effective amount of 0.25 weight percent. A commercial carbon black filler which may be used comprises 50 percent carbon black and 50% carrier; for example use may be made of the carbon black filler product MB-924 (Soucy Tecno Co., Sherbrooke, Quebec, Canada). Pellets (and resultant) aggregate of the present invention preferably comprise about 4 weight percent filler such as titanium dioxide.

A blowing agent such as pentane is commonly used in the process of forming porous beads (i.e., the aggregate, en masse) from the black pellets. Pellets are converted to beads using methods which are well known in the prior art. The aggregate is then captured within a generally tubular sheath of netting with or without a corrugated perforated pipe running lengthwise within the aggregate, using means such as those described in the Houck patents mentioned in the Background.

When the black-pellet polystyrene is expanded, that results in a gray color bead/aggregate. The gray color can be attributed to the spacing apart of the carbon bearing polystyrene plastic material by the multiplicity of gas-filled pores which characterize expanded polystyrene material. A representative prior art film that has been used for wrapping bundles of prior art blue-bead drainage units (described in the Background) is 70 gage (about 0.7 mil) thick clear LDPE plastic stretch film (AEP Industries, Montvale, N.J., U.S.). The film is ultra-violet inhibited ("UVI"). That is, the film contains additives which hinder the film from degrading—over a period of months—depending on the intensity and time of sunlight exposure. And as mentioned in the Background, use of the film prevents UV degradation of beads. The prior art film does not significantly hinder transmission of infra-red radiation from the sun.

When drainage units having gray aggregate were wrapped in the same clear UV resistant wrap as had been found satisfactory for drainage units formed of prior art aggregate, it was surprisingly discovered that the gray aggregate of the present invention degenerated by shriveling up upon exposure to direct temperate zone summer sunlight for even a short period of time, e.g., in as little as four hours. That degree of exposure can be typical in the handling of a drainage unit as it moves from factory to burial at the point of use. Research has now shown that, despite the small fractional weight percent of carbon, the gray aggregate heats up substantially more than a reference material, namely prior art light blue aggregate. This is a particularly surprising result, because as described next, the wrapping does not seal the ends of the drainage units.

Figure 2:
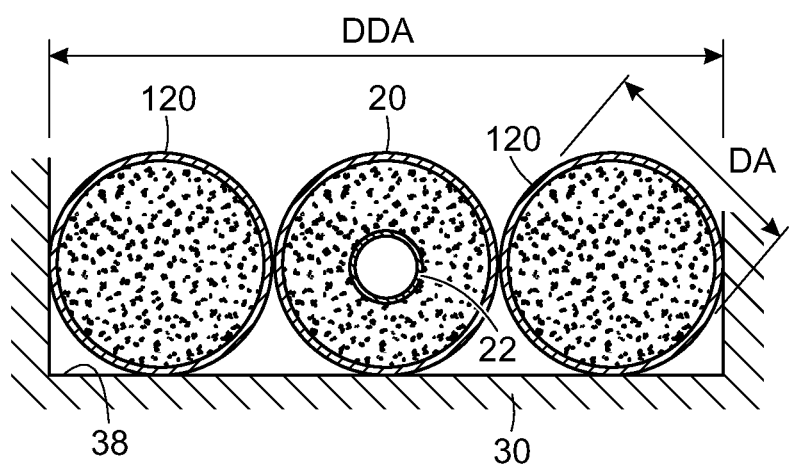
FIG. 2 is an end view showing three drainage units arranged within a trench in soil, shown in cross section.

FIG. 2 is end view showing the three drainage units as they are installed in a trench 38 in soil 30 of the earth, prior to back-filling of the trench. There is a set of three side-by-side drainage units: a center unit 20 having a perforated pipe 22 like that shown in FIG. 1, together with left side unit 120 and right side unit 120, which side units do not have a pipe. In a typical use, water flows down the pipe 22, through the aggregate of the unit 20 and into the interstices amongst the aggregate of the adjacent left and right side units 120. Based on that common use, drainage units have been familiarly assembled for shipment in a set of three units, and they are likewise treated as such in carrying out the invention. In an embodiment of the present invention, each drainage unit has an aspect ratio (length to diameter ratio) of about 10 to 1 and a set of three units has an aspect ratio (length to width) of about 3.3 to 1. In other embodiments of the invention a set of two drainage units, or a set of more than three units, may be wrapped as described herein.

Figure 3:
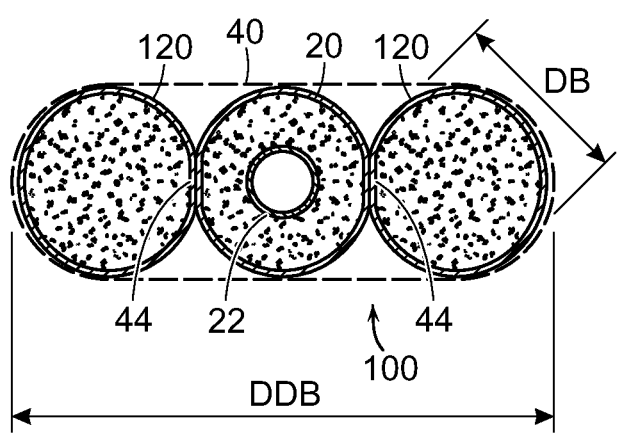
FIG. 3 is an end view of three drainage units like those shown in FIG. 2, where the drainage units have been tightly wrapped in film with partly exposed drainage unit body-ends.
Figure 4:
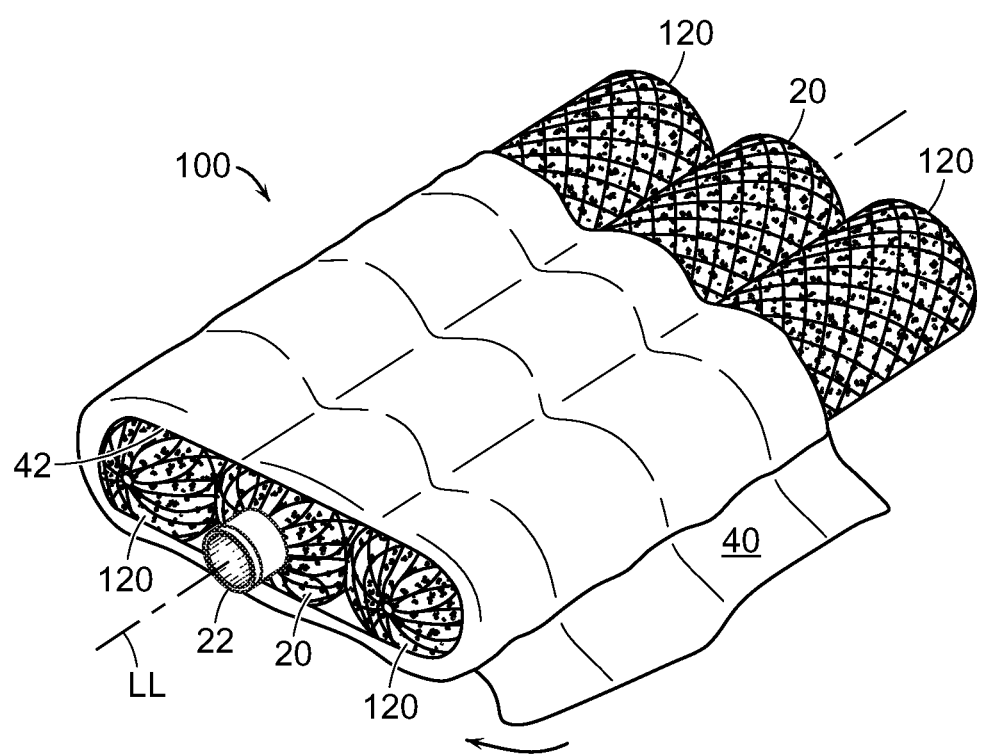
FIG. 4 is partial perspective view of a wrapped set of three drainage units like those shown in FIG. 3.

FIG. 3 is an end view of three drainage units arranged in a configuration like that shown in FIG. 2 the three units now have a wrapping of film 40. FIG. 4 is a partial perspective view of the set 100 of three drainage units as they are being wrapped with film 40 at a first end of the set. The film may be about 2-3 feet wide and is wrapped in layers around a first end of the set. Typically a commercial machine (not shown) is used. FIG. 4 shows the film first layers as they are being applied at the first end of the set which has a lengthwise axis LL (corresponding with the axis L of drainage unit 20. Film 40 has a lengthwise-end-edge 42 that hangs over, i.e., lies outboard of, the end of the drainage unit set. The film 40 laps over the ends of the bodies of the drainage units 20, 120; but the film 40 does not close off or seal the lengthwise ends of the bodies of the drainage units, i.e., those end portions of the units which exclude any projecting pipe at the end. With continued wrapping, the film is spiraled down the length of the set, until an overlapping is achieved at the second end which is like that at the first end. Compared to a tied-closed bag, the lack of sealing at the end of the units means there is an opening for some air circulation. Typically at any given point along the length of the drainage unit set there will be 2 or more layers, typically 2 to 4 layers of film. The film is wrapped upon itself and the nature of the stretch film which is used is such that it clings or adheres to itself.

An important and unique feature of using film, compared to inserting a set of drainage units into a plastic bag, is that during wrapping the film is pulled firmly in the direction transverse to the length of the drainage unit, sufficient to compresses the cross sections of the drainage units. This effect is illustrated by comparing the "natural state" of drainage units shown in FIG. 2 with their wrapped state in FIG. 3. The tension in the film has exerted a compressive force on each drainage unit and on the assembly as a whole. The diameter of each unit 20, 120 has been reduced from nominal DA to nominal DB, about 5-10 percent. And lateral force of the film has pushed the units cross-wise into each other, making the cross section of each unit less circular as a result of flattening at surface portions 44 where the units contact each other. As a result, the width of a set of three units has been reduced by more than 5 percent, preferably about 8 percent. By example, for three 12 inch diameter units the width dimension DDA of nominally 36 inches has been reduced to width dimension DDB of nominally 33 inches. Artisans recognize and characterize imperfectly circular objects as having diameters, for practical reasons of definition and comparison. Thus imperfectly circular or deformed drainage units such as units 20, 120 shown in FIG. 3 are characterized here as drainage units having nominally circular cross sections and associated nominal diameters.

The foregoing reductions in dimensions, which is only achieved by tightly wrapping the drainage units in film, provides a substantial advantage over loose wrapping or bag-packaging with respect to shipping cost. With the tight wrapping and compression, about 10% more 12 inch by 10 foot drainage units can be shipped in a conventional size U.S. highway closed-box semi-trailer.

After shipping and optionally storing the set of drainage units, at a point of use, the film wrapping is removed from a set of drainage units by cutting or unwrapping. Thereupon the drainage units resiliently expand to substantially the dimensions which they had prior to being wrapped; and the drainage units are buried in the soil and water is either flowed into the drainage units and dispersed in the soil, or water is flowed from the soil into the drainage units and removed.

Tests were conducted by exposing experimental and prior art sets of drainage units to nominally-mid-day summer sunlight for an equal number of hours at about 90 F ambient temperature. The drainage units had a configuration nominally like that shown in FIG. 3 and FIG. 4, being wrapped tightly as just described. Sets of three units were wrapped in the clear prior art UV impeding film which was like the 70 gage AEP Industries material mentioned above. The temperature of aggregate was measured in proximity to the mid-length of the unit/set by non-contact infra-red radiation pyrometer.

The temperature of a set of drainage units comprised of prior art blue aggregate rose to about 130 F; while the temperature of a set of drainage units comprised of the exemplary gray aggregate rose to about 160 F, and in some tests, even more, to 180 F. It was thus determined that the shriveling resulted from the loss of the blowing agent (e.g., pentane gas) from within the beads due to heating of the beads by the solar radiation.

In the present invention, drainage units having gray aggregate are wrapped in a film which has the property of impeding UV radiation and a significant portion of radiation in the non-UV portion of the spectrum, in particular in the infra-red portion of the spectrum. (In typical solar radiation received on earth, less than 7% of the energy is transmitted in the UV range (300-400 nm wavelength); and about 49% is transmitted in the infra-red range (700-2500 nm)). A film that is used in the present invention significantly lessens transmission of solar infra-red radiation, compared to the transmission allowed by previously used clear plastic film with UVI.

When tests like those mentioned in the preceding paragraph were carried out, the temperature of the gray aggregate did not exceed an about 150 F temperature and there was no shriveling of the aggregate beads. An example of film which may be used in the invention is 125 gage (about 1.2 mil thick) film bearing product number QLFOX20125weuv6 film (AEP Industries, Montvale, N.J., U.S.). The exemplary film is white in appearance. Other films which significantly impede both the UV and infra-red portions of the sunlight spectrum may be used.

A film which is useful in the present invention need not impede all of the impinging sunlight. The term "opaque" is used in a relative sense, in comparison to clear, and it does not here require that no light be transmitted, only that the intensity be reduced sufficient to avoid the unwanted heating which is described. Opaque film having pores may be used, provided the film substrate material property decreases the transmission of radiant sunlight energy sufficiently, in view of the transmissive pore openings.

Further tests show that in the absence of film wrapping, gray aggregate does not become heated to above a temperature which caused degradation, nominally greater than 150 F. It may be said that the need to wrap the aggregate for physical and UV protection that was taught by the prior art is what contributed to the over-heating problem, which has now been solved. In an unwrapped drainage unit, heat due to absorption of sunlight radiant energy is lost due to re-radiation and convection. Wrapping a drainage unit with film to block UV is a heat-increasing factor in the same way that glass greenhouses for plants are effective in keeping plants warm. When drainage units are wrapped in film, air circulation (convection) is inhibited as a side effect.

At this point the data and study of science have not been sufficient to explain well the physics of the problem and our solution. Generally, this might be said: We are concerned with the absorptivity of aggregate, at infra-red wavelengths (700+ nm) which are characteristic of sunlight, and with the emissivity of the aggregate at nominal 100-200 degrees F., when radiating to a surmised black body (i.e., the environment around a stored drainage unit). The new gray aggregate mentioned above has either or both a higher absorptivity or a higher emissivity than does the prior art blue aggregate, so the temperature of the gray aggregate will be higher upon exposure to a particular intensity and duration of sunlight—assuming same size and shape of aggregate, and same wrapping.

Prior art light blue aggregate drainage units wrapped in the preferred film of the present invention will rise in temperature to an extent, but substantially less than gray aggregate of the present invention. The behavior of units with light blue color aggregate is judged to be comparable to white aggregate, i.e., that aggregate which comprises expanded polystyrene beads containing no coloring agent, having an appearance that is imparted by the about 4 weight percent titanium dioxide filler.

While the invention is described in context of recycled polystyrene, the invention is applicable to virgin polystyrene which has filler/colorant containing carbon black. While said 0.25 weight percent carbon is preferred, lesser amounts may be used in carrying out the invention. While adding carbon black colorant/filler to the pre-expansion polystyrene pellet material is preferred in carrying out the invention, other colorant/fillers may be used and when they impart to the aggregate the a significant heat absorbing property as does carbon blank, film with both UV and infra-red impeding property may be used.

While it is preferred that the film be wrapped tightly, sufficient to compress the drainage units, in carrying out the invention a set of drainage units comprised of heat absorbing aggregate may be wrapped in infra-red impeding film using minimal tension and compression. The same kind or heat-rise problem will result if the prior art film is used, and can be avoided by use of film in accord with the teaching of the present invention.

The invention, with explicit and implicit variations and advantages, has been described and illustrated with respect to several embodiments. Those embodiments should be considered illustrative and not restrictive. Any use of words such as "preferred" and variations suggest a feature or combination which is desirable but which is not necessarily mandatory. Thus embodiments lacking any such preferred feature or combination may be within the scope of the claims which follow. Persons skilled in the art may make various changes in form and detail of the invention embodiments which are described, without departing from the spirit and scope of the claimed invention.

What is claimed is:

1. In a method of manufacturing, shipping, storing, and installing drainage units, wherein each drainage unit has a generally tubular shape, a length, a nominally circular cross section and an associated nominal diameter, wherein each drainage unit is comprised of polystyrene bead aggregate contained within a plastic netting sleeve, and wherein for shipment and storage a plurality of drainage units is assembled as a set of three side-by-side units, the set having a lengthwise axis and a width nominally equal to three of said drainage unit nominal diameters, the improvement which comprises:

(a) forming pellets comprised of recycled polystyrene that is a mix of white polystyrene and colored polystyrene, with a colorant having about 0.25 weight percent carbon black, and about 4 weight percent titanium dioxide filler;

(b) converting the pellets into beads of expanded polystyrene, the beads having a gray color and a property of absorbing solar radiation energy in the infra-red portion of solar radiation spectrum substantially more than all-white polystyrene beads having said about 4 weight percent titanium dioxide filler, which beads lack said about 0.25 weight percent carbon black;

(c) making a plurality of said drainage units having said beads as aggregate;

(d) arranging three of said drainage units in side-by-side fashion as a set of drainage units having a width and a lengthwise axis corresponding to said drainage unit lengths, and wrapping the set of drainage units with film made of plastic by winding the film around the set in a direction transverse to the lengthwise axis of the set, wherein the film has the property of inhibiting the transmission of solar radiation with respect to both the UV radiation portion thereof and the infra-red radiation portion thereof; and, (e) transporting said set of drainage units in said wrapped condition to a point of use of said drainage units, exposing said set of drainage units to sunlight, then removing said film from said set of drainage units, and burying the drainage units of said set within soil.

2. The method of claim 1 further comprising, during step (d), applying tension to the film sufficient to change the cross section shape of each drainage unit, sufficient to make the width of the set of three drainage units at least about 5 percent less than the sum of three said nominal diameters, wherein the wrapping of film leaves portions of each lengthwise end of the set uncovered.

3. The method of claim 1 wherein when said set of drainage units is exposed to direct sunlight when in said wrapped condition during step (e), said aggregate has an infra-red light absorptivity which causes the beads contained as aggregate in each drainage unit to become heated to a temperature in excess of 150 degrees Fahrenheit.

4. The method of claim 1 wherein said plastic film of step (d) is opaque, optionally white.

* * * * *